Feb. 25, 1930.   A. B. SMEDLEY   1,748,587
WINDOW GLASS OR THE LIKE
Filed May 2, 1927
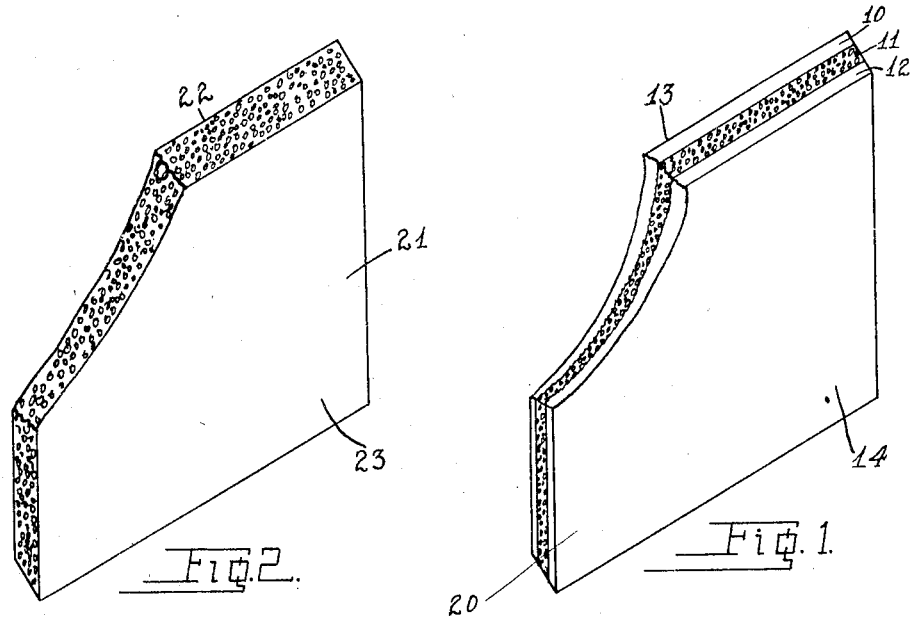
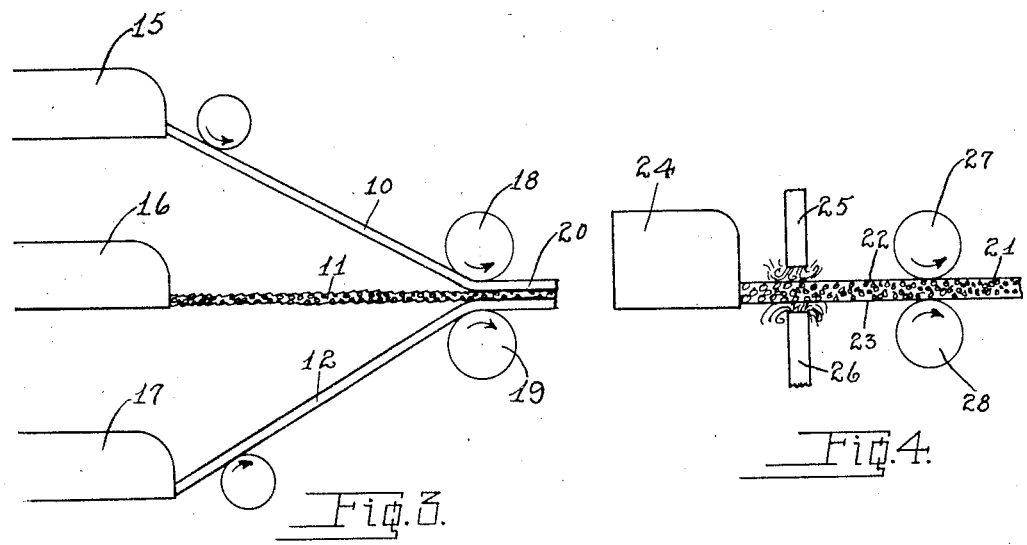
Inventor
ANDERSON B. SMEDLEY.
By Murray and Rigelter
Attorneys Patented Feb. 25, 1930

1,748,587

UNITED STATES PATENT OFFICE

ANDERSON B. SMEDLEY, OF CINCINNATI, OHIO

WINDOW GLASS OR THE LIKE

Application filed May 2, 1927. Serial No. 188,139.

This invention relates to improvements in window glass and the like.

An object of this invention is to produce a plate glass for use in windows or other glass articles that has a low degree of transmission of heat by conduction. This glass will be found useful in textile and paper mills and other factories wherein it is necessary to maintain a given uniform high or low temperature.

Another object of this invention is to produce a glass for window lights and other articles having the property to diffuse direct sun light thereby to prevent glare from objects and tools. This glass will be found useful in practically all industrial buildings and factories, as well as for skylights and to intercept the direct sun's rays.

Another object is to produce a window glass having the above properties and having the outer surfaces of the glass smooth to facilitate cleaning thereof.

These and other objects are attained by the means described herein and disclosed in the accompanying drawings, in which:—

Fig. 1 is a fragmental perspective view of a piece of glass embodying this invention.

Fig. 2 is a fragmental perspective view of a modified form of a piece of glass embodying this invention.

Fig. 3 is a diagrammatic view of a method for making the glass shown in Fig. 1.

Fig. 4 is a diagrammatic view of making the glass shown in Fig. 2.

Heretofore plain and prismatic or ribbed glass have been used for window lights and the like in industrial buildings and factories. These types of glasses have been found objectionable because of various disadvantages, first in that they transmit heat from within the building by conduction. Second, plain clear ordinary window glass in addition permits the direct sun light to penetrate into the building which causes a glare from tools and other objects thereby interfering with production and causing various annoyances. Third, prismatic or ribbed glass, while diffusing the sunlight in one plane, is objectionable because some glare results because of the incomplete diffusion of the light causing glaring from tools and other inconveniences. Another disadvantage of the ribbed glass is the difficulty encountered in cleaning. It has been found that practical cleaning methods restore but 70% of the original light transmission to prismatic or ribbed glass. All of these disadvantages have been overcome by the improved window glass of this invention.

The preferred embodiment of this invention is illustrated in Fig. 1 and comprises 3 layers of glass 10, 11 and 12. The outer layers of glass 10 and 12 are plain ordinary window glass having secured between them the glass layer 11, which is composed of a number of air filled or gas filled cells. The outer surfaces 13 and 14 of this glass are perfectly smooth so that it may be easily and readily cleaned. This type of glass may be manufactured by the method shown diagrammatically in Fig. 3. Glass furnaces 15, 16 and 17 are employed from which each of the sheets of glass 10, 11 and 12 are drawn. Each of the furnaces 15 and 17 are fired to the maximum heat for producing clear window glass while the temperature of the furnace 16 is somewhat lower than the temperatures of the furnaces 15 and 17, to produce, what may be termed, an incompletely fined or seedy sheet of glass. The low temperature of the furnace 16 does not completely fine the silicates formed in the manufacture of glass whereby a glass filled with minute bubbles or cells results. The sand or silica from which the glass is made is treated and mixed with $CaCO_3$ and $Na_2CO_3$ before they are placed in the glass furnace. The bubbles in the glass are caused by air trapped in the raw materials and by trapping $CO_2$ given off in the reaction. These bubbles are ordinarily eliminated from plain clear glass by raising the temperature of the furnace and by the addition of certain materials. The three sheets of glass 10, 11 and 12 are drawn respectively from the glass furnaces 15, 16 and 17 and are passed between rollers 18 and 19 where they are fused or pressed into a single sheet of glass as shown at 20 in Figs. 1 and 3.

The modified form of gas filled glass 21 as shown in Figs. 2 and 4 has smooth outer surfaces 22 and 23 the same as the glass sheet 20. This glass may be manufactured by the method diagrammatically shown in Fig. 4. This method comprises a low temperature furnace 24, similar to the furnace 16, from which a single sheet of glass is extracted. Positioned outside of the furnace are a pair of torches or means 25 and 26 for applying heat to the outer surfaces 22 and 23 of the glass sheet. As the sheet of glass passes beyond the torches 25 and 26 rolls 27 and 28 operate on the surfaces 22 and 23 to smooth and polish them. It should be noted that this type of glass has the same qualities and properties as the glass 20.

It has been found that the gas filled bubbles act as an insulator to the heat and cold and prevent the glass from transmitting heat by conduction. In order to increase or decrease the heat conductivity of the glass it is necessary only to increase or decrease the number and size of the bubbles. A large number of small bubbles decreases the heat conductivity of the glass and at the same time increases the diffusion of light. It should be noted that while this glass is not transparent it is about as translucent as prismatic or ribbed glass now used. It should also be noted that this improved glass may be readily cleaned because of the smooth outer surface. From the foregoing it must be obvious that this glass overcomes practically all of the objections to plain glass and ribbed or prismatic used heretofore in industrial buildings, factories, paper and textile mills, etc.

What is claimed is:

1. A glass for window lights and other glass articles comprising three layers of glass, the two outer layers being of clear transparent glass having smooth outer surfaces, the center layer being translucent and permeated with bubbles, and a heat insulating and light diffusing agent, air and gas, filling the bubbles.

2. A glass for window lights and other glass articles comprising two layers of plain transparent window glass having fused to and between them a third layer of glass permeated with gas and air filled bubbles.

3. A glass for window lights and other glass articles comprising a homogeneous mass having smooth outer surfaces and a center section of gas and air filled bubbles, the gas and air filled bubble section being co-extensive in area with the area of the smooth surfaces.

4. A plate glass having smooth outer surfaces and gas filled cells intermediate the smooth outer surfaces.

5. A plate glass comprising a central section flanked by substantially smooth outer surfaces, the central section comprising a plurality of gas filled cells.

6. As a new article of manufacture a heat insulating and light diffusing glass comprising a body having gas filled bubbles and substantially smooth outer faces.

In testimony whereof, I have hereunto subscribed my name this 11th day of April, 1927.

ANDERSON B. SMEDLEY.